(12) United States Patent
Ido

(10) Patent No.: US 10,657,427 B2
(45) Date of Patent: May 19, 2020

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Yoko Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/279,063

(22) Filed: Feb. 19, 2019

(65) Prior Publication Data

US 2019/0266454 A1  Aug. 29, 2019

(30) Foreign Application Priority Data

Feb. 26, 2018 (JP) .................................. 2018-031474

(51) Int. Cl.
*G06K 15/02* (2006.01)
*G06F 7/499* (2006.01)

(52) U.S. Cl.
CPC ..... *G06K 15/1832* (2013.01); *G06F 7/49963* (2013.01); *G06K 15/1802* (2013.01); *G06K 15/184* (2013.01); *G06K 15/1843* (2013.01)

(58) Field of Classification Search
CPC .......... G06K 15/1832; G06K 15/1802; G06K 15/184; G06K 15/1843; G06F 7/49963
USPC ......................... 358/1.9, 2.1, 1.15, 2.99, 448
See application file for complete search history.

(56) References Cited

U.S. PATENT DOCUMENTS

| 8,134,733 B2* | 3/2012 | Morales | G06F 3/1275 |
| | | | 358/1.13 |
| 2017/0053197 A1* | 2/2017 | Sakurai | G06K 15/1852 |
| 2017/0154251 A1* | 6/2017 | Nagasaka | G06K 15/1843 |

FOREIGN PATENT DOCUMENTS

JP  2013-257805 A  12/2013

\* cited by examiner

*Primary Examiner* — Quang N Vo
(74) *Attorney, Agent, or Firm* — Venable LLP

(57) ABSTRACT

The information processing apparatus: generates PDL data by calculating, in a case where a drawing-target object within XPS format drawing data is a text-attribute character object that is drawn by using a font, a character advance width from font data; and performing rendering for the XPS format drawing data by using the calculated character advance width.

18 Claims, 10 Drawing Sheets

FIG.6A

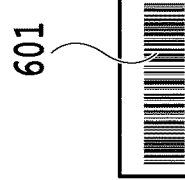

```
<Canvas RenderTransform="1,0,0,1,19.2,19.2">
<Glyphs FontUri="../Resources/Fonts/7891BABD-A526-526B-978A-12F512345678.odttf"
UnicodeString="/^AN0Y"^)L?J8GAa3I9L7J'X#Y{"
Indices="18,16;65,28;36,24;49,20;19,20;60,24;5,16;65,28;12,20;47,24;34,28;45,16;27,28;
         611 612 613 614
42,17;36,24;68,19;22,20;44,24;28,19;47,24;26,29;45,16;10,24;59,19;6,20;60,24;91"
FontRenderingEmSize="160" OriginX="181.92" OriginY="403.36" Fill="#000000"
RenderTransform="0.116986,0,0,0.117,0,0"/>

<Glyphs FontUri="../Resources/Fonts/7891BABD-A526-526B-978A-12F512345678.odttf"
UnicodeString="/^AN0Y"^)L?J8GAa3I9L7J'X#Y{"
Indices="18,16;65,29;36,23;49,20;19,20;60,24;5,16;65,28;12,20;47,24;34,28;45,16;27,28;
42,17;36,24;68,19;22,20;44,24;28,20;47,23;26,29;45,16;10,24;59,19;6,20;60,24;91"
FontRenderingEmSize="160" OriginX="5261.44" OriginY="8966.88" Fill="#000000"
RenderTransform="0.116986,0,0,0.117,0,0"/>
</Canvas>
```

610
620

|  | Character 701 to character 702 | | | Character 702 to character 703 | | | Character 703 to character 704 | | |
|---|---|---|---|---|---|---|---|---|---|
|  | character advance width 711 | offset 2 | space width W12 | character advance width 712 | offset 3 | space width W23 | character advance width 713 | offset 4 | space width W34 |
| GDI | 19 | 9 | 28 | 33 | 0 | 33 | 28 | 4 | 32 |
| XPS (TL) | 18.718 | 9.359 | 28.077 | 32.756 | 0 | 32.756 | 28.077 | 4.679 | 32.756 |
| XPS (BR) | 18.718 | 9.359 | 28.077 | 33.926 | 0 | 33.926 | 26.907 | 4.679 | 31.586 |
| Font (actual value) | 18.718 | 9.359 | 28.077 | 32.756 | 0 | 32.756 | 28.077 | 4.679 | 32.756 |
| Font (rounded) | 19(*1) | 9(*2) | 19+9=28 | 33(*1) | 0 | 33+0=33 | 28(*1) | 4(*2) | 28+4=32 |

(*1) rounding off
(*2) rounding down

FIG.8

INFORMATION PROCESSING APPARATUS, INFORMATION PROCESSING METHOD AND STORAGE MEDIUM

BACKGROUND OF THE INVENTION

Field of the Invention

The present invention relates to a drawing control technique in an information processing apparatus that performs printing processing by using a graphics engine.

Description of the Related Art

As the processing flow for printing a document by a printer from an application that runs on the Windows (registered trademark) operating system of Microsoft Corporation, the following two flows exist. That is, the GDI (Graphics Device Interface) print path and the XPS (XML Paper Specification) print path. The GDI print path and the XPS print path are not in an exclusive relationship and, for example, it is possible to convert drawing data in the GDI format (hereinafter, GDI format drawing data) generated by an application using the GDI into drawing data in the XPS format (hereinafter, XPS format drawing data) and to generate a print job by an XPS printer driver. The conversion of drawing data is performed by a conversion module called MXDC (Microsoft XPS Document Converter).

Here, in printing a document created by using a barcode font in accordance with a print job generated via the MXDC, there is a case where the spacing between bars configuring a barcode shifts. This results from an arithmetic operation error at the time of drawing data conversion in the MXDC. As a technique for appropriately printing a document created by using a barcode font, for example, there is one described in Japanese Patent Laid-Open No. 2013-257805. The outline thereof is as follows. First, in a case where a barcode image is included in printing-target image information, an application stores in advance barcode identification information in a storage unit separately from image information to be delivered to a printer driver via the GDI. Then, in a case where a barcode font is included in image information to be acquired via the GDI, the printer driver generates a control command for the barcode portion based on the barcode identification information stored in the storage unit and prints the barcode by using the generated control command.

However, with the technique of Japanese Patent Laid-Open No. 2013-257805 described above, the application needs to include a function to separately store barcode identification information in the storage unit, and therefore, the technique cannot be used by a general application not having such a function.

SUMMARY OF THE INVENTION

The information processing apparatus according to the present invention includes: a memory that stores a program; and a processor that executes the program to perform generating PDL data by: calculating, in a case where a drawing-target object within XPS format drawing data is a text-attribute character object that is drawn by using a font, a character advance width from font data; and performing rendering for the XPS format drawing data by using the calculated character advance width.

Further features of the present invention will become apparent from the following description of exemplary embodiments with reference to the attached drawings.

BRIEF DESCRIPTION OF THE DRAWINGS

FIG. 6A is a diagram showing an example of a document in which barcodes are arranged and FIG. 6B is a diagram showing an example of XPS data specifying drawing using a barcode font;

FIG. 8 is a table that puts together character advance widths, offsets, and space widths;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
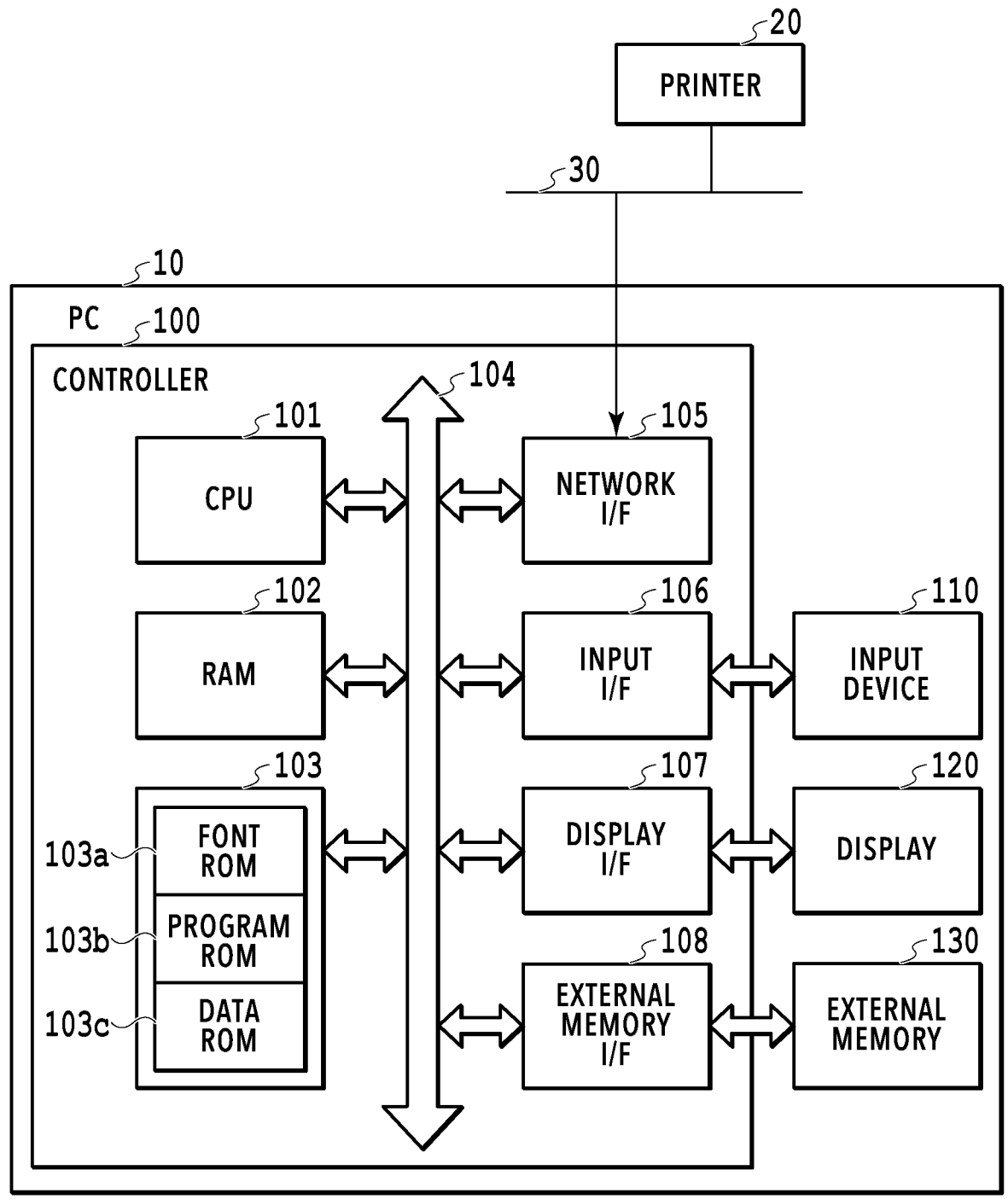
FIG. 1 is a block diagram showing an example of a hardware configuration of a PC.

FIG. 1 is a block diagram showing an example of a hardware configuration of a PC as an information processing apparatus that generates a print job according to the present embodiment. A PC 10 includes a controller 100, an input device 110, a display 120, and an external memory 130. The controller 100 includes a CPU 101, a RAM 102, a ROM 103, a network I/F 105, an input I/F 106, a display I/F 107, and an external memory I/F 108 and these units are connected to one another via a system bus 104.

The controller 100 centralizedly controls the PC 10. The CPU 101 controls each unit connected to the system bus 104 in accordance with programs stored in the RAM 102. The RAM 102 also functions as a main memory, a work memory, and so on of the CPU 101. The ROM 103 stores various programs and data and includes three divided portions, that is, a font ROM 103a that stores various fonts, a program ROM 103b that stores a boot program, a BIOS, and so on, and a data ROM 103c that stores various kinds of data. The network I/F 105 is an interface that performs communication processing with an external device, such as a printer 20, via a LAN 30. The input I/F 106 is an interface that receives a user input by using the input device 110, such as a keyboard and a pointing device (mouse). The display I/F 107 is an interface that controls display processing for the display 120. The external memory I/F 108 is an interface that performs access control with the external memory 130, for example, such as an HDD and an SSD. In the external memory 130, an operating system (OS), various kinds of software in charge of printing processing, and further, various kinds of data, such as user files and edited files, are stored. In the present embodiment, it is assumed that Microsoft Windows is used as the OS.

Figure 2:
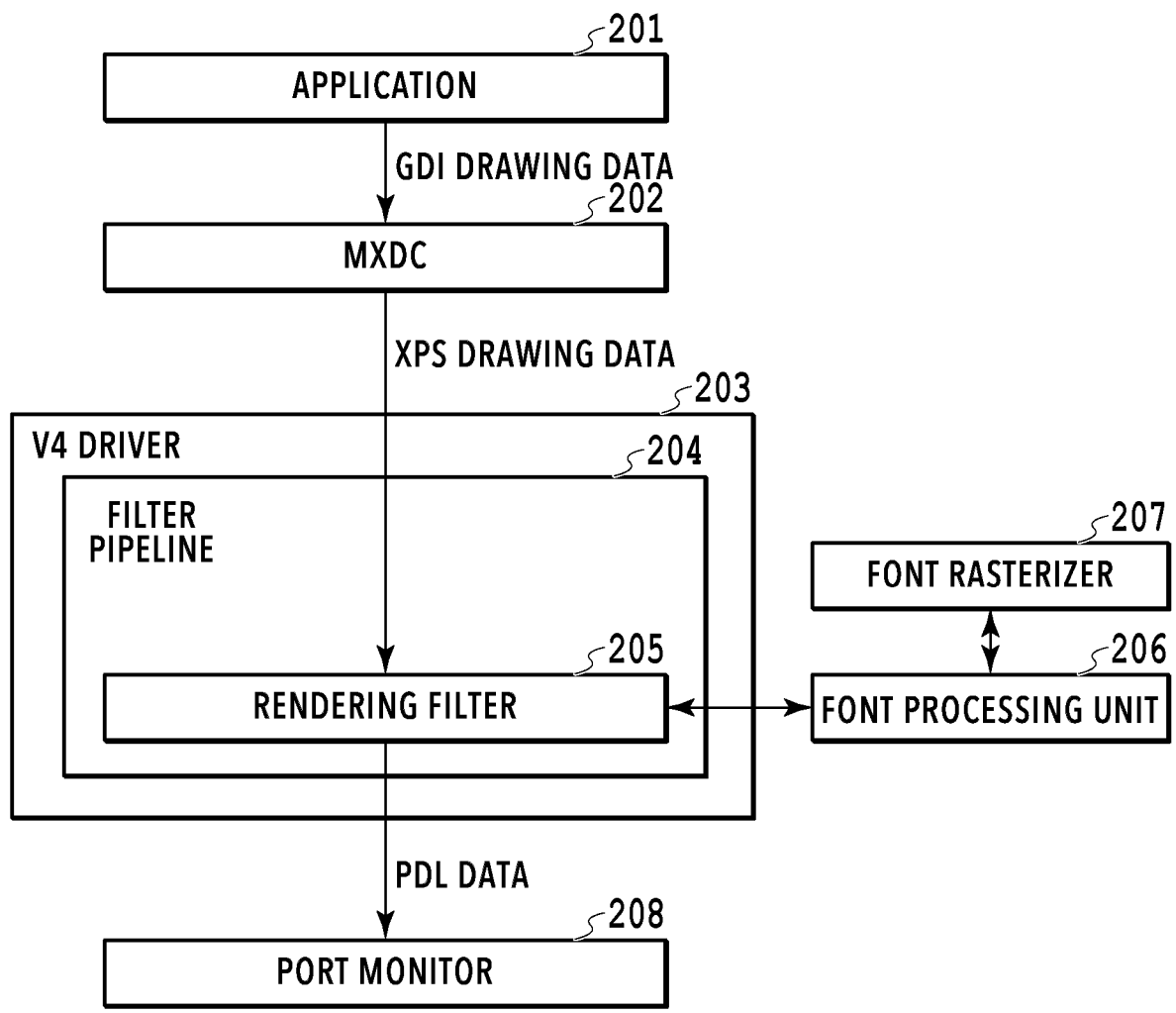
FIG. 2 is a diagram showing an example of a software configuration relating to print job generation processing using a V4 driver.

As described in Description of the Related Art, after Windows 8 (registered trademark), a printing processing flow called the XPS print path is added. In the XPS print path, XPS format drawing data is generated by an application compatible with the XPS and converted into PDL data by the Version 4 printer driver (hereinafter, "V4 driver"). The present invention premises a scene in which GDI format drawing data is generated in an application compatible with the conventional GDI, and the drawing data is converted into XPS format drawing data by the MXDC and input to the V4 driver. FIG. 2 is a diagram showing an example of a software configuration relating to print job generation processing using the V4 driver in the PC 10. In the following, detailed explanation is given along FIG. 2.

An application 201 is application software compatible with the GDI for a user to create a document and to give print instructions and the like. In a case where print instructions are given by a user, the application 201 generates GDI format drawing data of a specified document by making use of the GDI. The generated GDI format drawing data is sent to an MXDC 202. In the present embodiment, the application 201 creates a document using a barcode font installed in the OS and outputs GDI format drawing data including font information to the MXDC 202. The MXDC 202 converts the received GDI format drawing data into the XPS format. Specifically, the MXDC 202 converts the received drawing data into XPS format drawing data in which a font name, GlyphIndex (hereinafter, described as "Gid"), and so on are described based on the font information. Then, the MXDC 202 outputs the converted XPS format drawing data to a V4 driver 203. The V4 driver 203 generates PDL data in accordance with output instructions by following a programming model called an XPS print filter pipeline (hereinafter, "filter pipeline"). The unit of printing processing in a filter pipeline 204 is called a filter and a single filter or a plurality of filters is linked in order by the filter pipeline 204 and performed. That is, the mechanism is such that the output of a certain filter is taken to be the input of the next linked filter and by each filter sequentially performing processing, PDL data (print job), which is a final output material, is generated. In the present embodiment, it is assumed that the filter pipeline 204 is configured by a single rendering filter 205 that generates PDL data from XPS format drawing data. The rendering filter 205 analyzes a drawing command in the XPS format input from the MXDC 202 and performs, after performing image processing, such as enlargement, reduction, and rotation processing, for each object in accordance with the necessity, rendering processing and generates PDL data. At this time, by making use of a font rasterizer 207 via a font processing unit 206, the rendering filter 205 acquires font information from font data installed in the OS and performs character drawing. In Table 1 below, an example of contents of font data is shown. However, items not relating to the present embodiment are omitted.

TABLE 1

| Gid | WX | BROX | | | |
| --- | --- | --- | --- | --- | --- |
| | | x0 | x1 | y0 | y1 |
| 1 | 0 | 0 | 0 | 0 | 0 |
| 2 | 500 | 0 | 0 | 0 | 0 |

TABLE 1-continued

| Gid | WX | BROX | | | |
| --- | --- | --- | --- | --- | --- |
| | | x0 | x1 | y0 | y1 |
| 18 | 160 | 0 | −197 | 159 | 1463 |
| 19 | 200 | 0 | −197 | 200 | 1463 |
| 36 | 240 | 0 | −197 | 239 | 1463 |
| 49 | 200 | 40 | −197 | 160 | 1463 |
| 65 | 280 | 80 | −197 | 201 | 1463 |
| 91 | 520 | 0 | −197 | 520 | 1463 |

In Table 1 described above, an item of Gid indicates a unique number allocated to each character possessed by the font. An item of WX indicates an advance width (in units of 100/UPM) to the next character. An item of BROX indicates a bounding box of a character that is actually drawn in a case where the X-coordinate and the Y-coordinate of the top left of a circumscribed rectangle of the character are taken as (x0, y0) and the X-coordinate and the Y-coordinate of the top right as (x1, y1). UPM is an abbreviation of units-per-em, indicating the number of units corresponding to 1 em, which is the reference of the character size.

Details of the rendering processing in the rendering filter 205 will be described later. PDL data generated by the rendering filter 205 is output to a port monitor 208. The port monitor 208 transmits the PDL data to the printer 20 through the LAN 30.

<Configuration of Rendering Filter>

Figure 3:
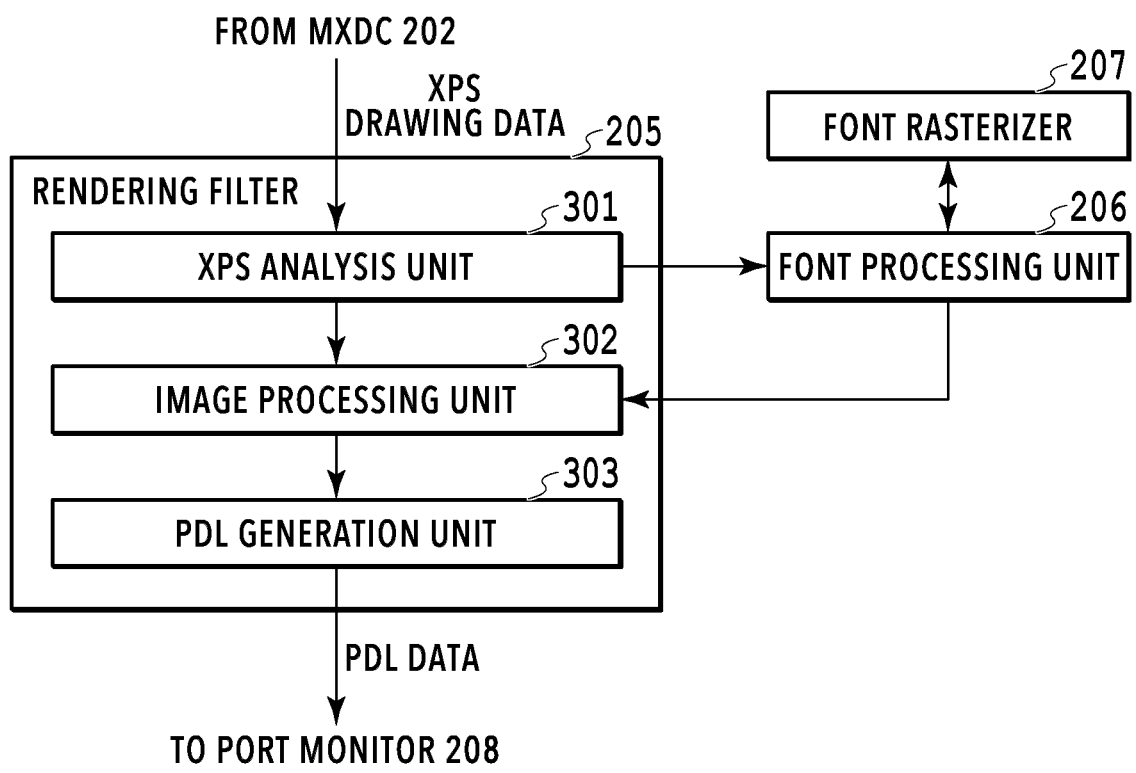
FIG. 3 is a function block diagram showing an internal configuration of a rendering filter 205.

FIG. 3 is a function block diagram showing an internal configuration of the rendering filter 205. The rendering filter 205 includes three processing modules: an XPS analysis unit 301, an image processing unit 302, and a PDL generation unit 303. In the following, each processing module is explained.

The XPS analysis unit 301 analyzes data (hereinafter, called "XPS data") including a group of drawing commands in the XPS format input from the MXDC 202 and sequentially outputs data (hereinafter, called "object data") for drawing one object or a plurality of objects. Here, each object has an attribute, such as photo (image), figure (graphics), and character (text). In a case of drawing a text-attribute object, the XPS analysis unit 301 accesses font data based on a font name described in XPS data by making use of the font processing unit 206. Then, the XPS analysis unit 301 acquires information on the glyph of a character, information on the advance width to the next character, and so on.

The image processing unit 302 performs image processing, such as enlargement, reduction, and rotation processing, for the object data input from the XPS analysis unit 301 in accordance with the necessity and then delivers the object data to the PDL generation unit 303. At this time, for the character font, rasterization is performed by using the font rasterizer 207 through the font processing unit 206. The PDL generation unit 303 generates PDL data based on one piece or a plurality of pieces of object data input from the image processing unit 302.

The XPS data, the object data, and the PDL data handled by the rendering filter 205 are each an aggregate of information on all drawing targets included in a printing-target document and the output order of all objects is also indicated.

<Barcode Drawing>

Following the above, barcode drawing using a barcode font, which is the premise of the present invention, is explained briefly. The barcode font refers to a font for displaying a numerical value and a value of a character string by converting them into the format of a barcode. In the following, a method is explained that keeps the spacing (space width) between bars an ideal spacing as a barcode in a case where a barcode is drawn in the XPS print path and keeps the output results equal to those of the barcode drawing in the GDI print path.

Figure 4:
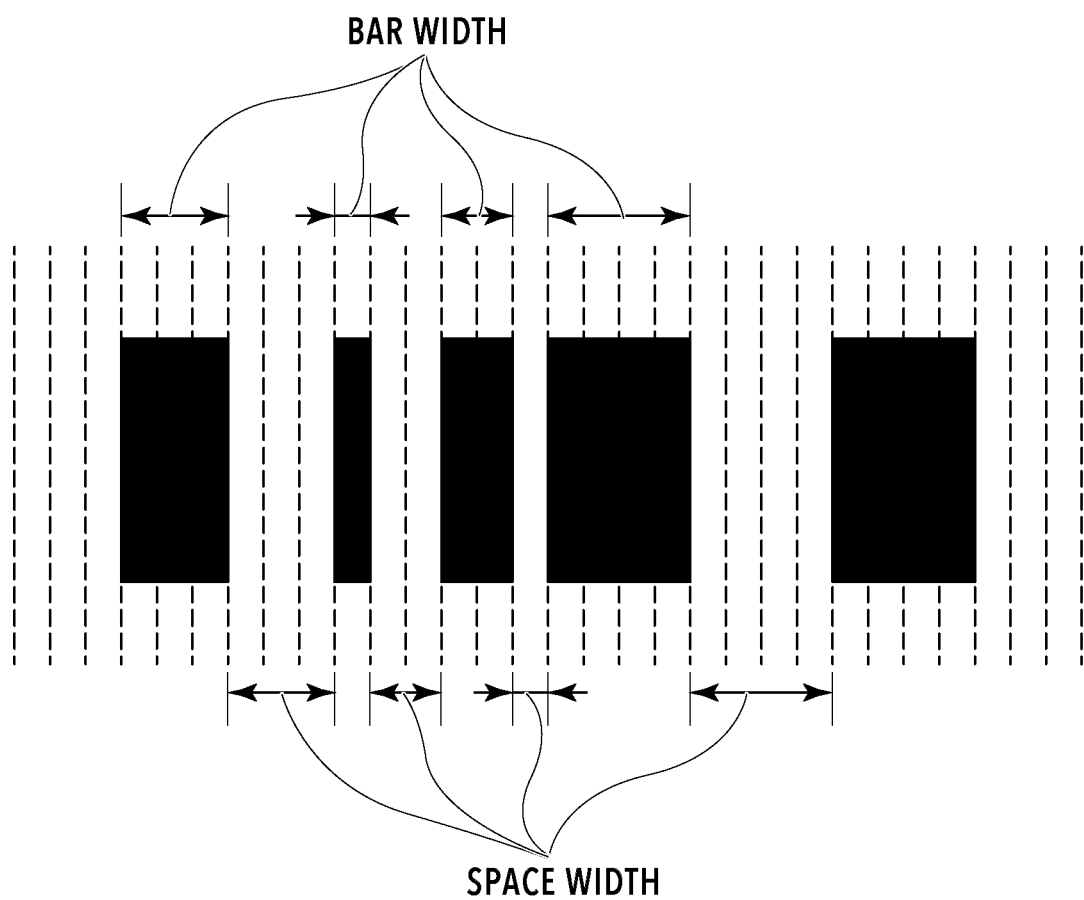
FIG. 4 is an explanatory diagram of the Code 128 standard.

Originally, whether or not what looks like a barcode, such as one printed on paper and the like, is recognized as a barcode (barcode recognition rate) depends on whether or not the width of a bar and the space width between adjacent bars appear in a specified ratio. For example, as shown in FIG. 4, the Code 128 standard specifies that the four kinds of bar width and the four kinds of space width be drawn in a ratio of 1:2:3:4. In a case where a barcode specified by the predetermined standard as described above is printed, it is known that a phenomenon occurs in which the spacing between two adjacent bars, that is, the coordinates indicating the start position and the end position of a space are different between the V3 driver and the V4 driver. The main cause of this is considered that the V3 driver and the V4 driver use different coordinate systems and in addition to this, the advance width to the next character (hereinafter, called "character advance width") is rounded to an integer in the conversion processing in the MXDC 202. Due to this, the drawing start position of a bar or a space shifts and the width of a space fluctuates, and therefore, there is a possibility that such a problem that it is not possible for the V4 driver to obtain the same output results as those by the V3 driver will arise. Consequently, in the present embodiment, a method is explained that obtains the output results equal to those by the V3 driver by re-finding an appropriate character advance width in a case where an output is produced by the V4 driver from information on the character advance width within font data.

<Review of Problem of the Present Invention>

In a case of a character object that is drawn by using a font, the position of data of the font is specified within a drawing command. FIG. 6A shows an example of a document in which a barcode 601 and a barcode 602 are arranged respectively at the top left and the bottom right of a page and FIG. 6B shows XPS data specifying that the two barcodes 601 and 602 be drawn by using a barcode font. The barcode 601 at the top left is called "TL barcode" and the barcode at the bottom right is called "BR barcode". Further, a drawing command 610 corresponding to the TL barcode 601 is called "XPS command TL" and a drawing command 620 corresponding to the BR barcode 602 is called "XPS command BR". In each of the XPS command TL 610 and the XPS command BR 620, information on the font data to be used, the character string, the character start position, the enlargement ratio, the character code, the character advance width, and so on, is included.

Figure 7:
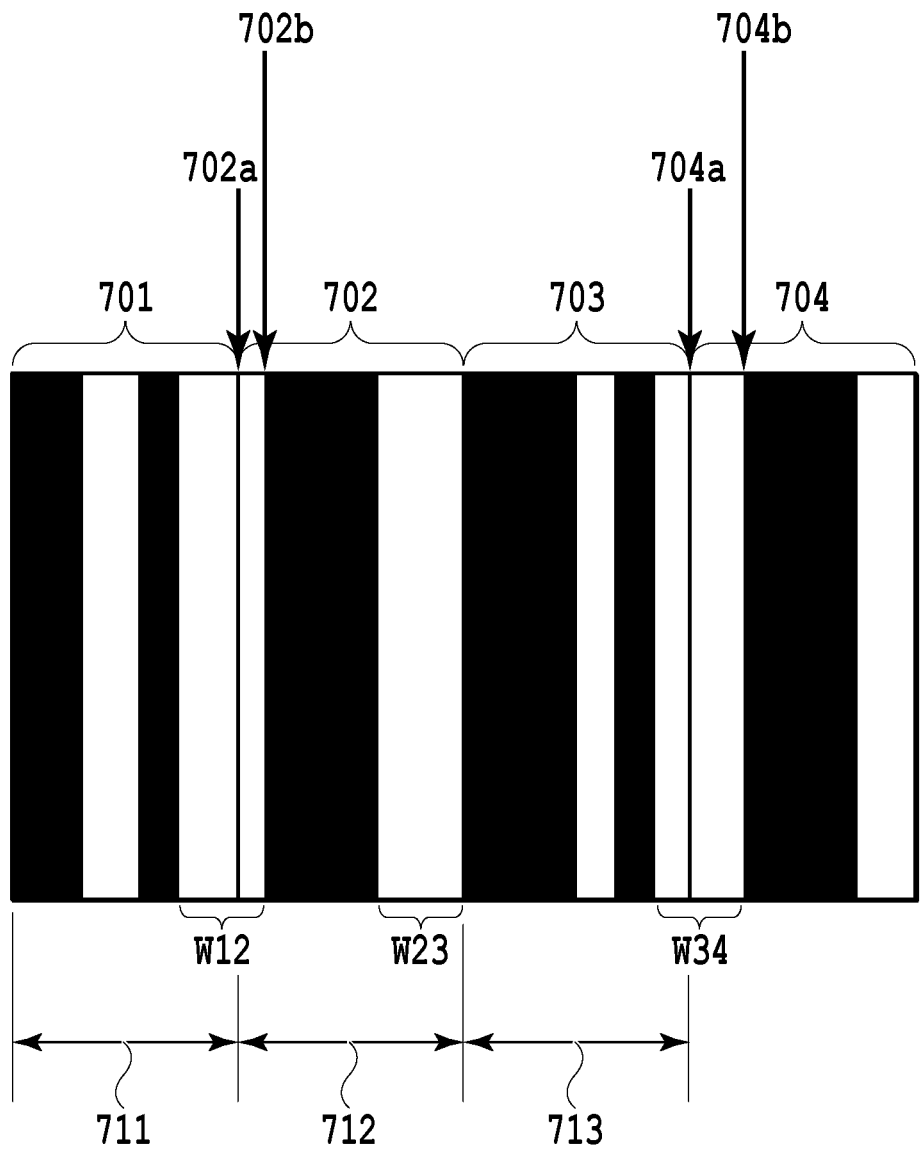
FIG. 7 is a diagram showing drawing results of four characters of a barcode.

In FIG. 6B, "RenderTransform" within a "Canvas" tag indicates the enlargement/reduction ratio and the offset position of Canvas. Further, "FontUri" within a "Glyphs" tag indicates the position of the font data used for rendering of a character. Then, "UnicodeString" indicates the character string desired to be drawn by using the font specified by FontUri and "Indices" defines how rendering is performed for the character string defined by UnicodeString. The definition for each character is bracketed by semicolons and four elements are each represented by being separated by a comma therein. In this example, in the order from the top, Gid, which is the unique number allocated to each character possessed by the font, and AdvanceWidth indicating the character advance width to the next character are possessed as the element. "FontRenderingEmSize" indicates the font size in the unit (the default value is 96 dpi) of the drawing surface. "OriginX" indicates the X-coordinate of the character start position and "OriginY" indicates the Y-coordinate of the character start position. "Fill" indicates character color information. "RenderTransform" indicates information on the character enlargement/reduction ratio and the offset position. It is assumed that the TL barcode 601 and the BR barcode 602 in FIG. 6A are barcodes whose contents are the same, using the same font data, and only the drawing positions are different. FIG. 7 is an enlarged diagram showing drawing results of the first character to the fourth character in the TL barcode 601 and the BR barcode 602. A double-pointed arrow 711 indicates the character advance width from a first character 701 to a second character 702, a double-pointed arrow 712 indicates the character advance width from the second character 702 to a third character 703, and a double-pointed arrow 713 indicates the character advance width from the third character 703 to a fourth character 704, respectively. Drawing is not necessarily started (that is, the pixel is painted black) from the character start position and for example, the character start position of the second character 702 is the position of an arrow 702a, but the drawing start position from which the pixel is painted black is the position of an arrow 702b. Similarly, for example, the character start position of the fourth character 704 is the position of an arrow 704a, but the drawing start position from which the pixel is pained black is the position of an arrow 704b. In font drawing, whether the space between characters can be kept the expected width becomes important in relation to the performance of a barcode. In the example in FIG. 7, in each of the TL barcode 601 and the BR barcode 602 arranged at the different positions within the page, it is required for space widths W12, W23, and W34 to be the same as the space width in the GDI print path. In this case, on a condition that the character advance width at the device resolution is calculated from XPS data, it has been made clear that such a problem as follows occurs by the experiment by the inventor of the present invention. In the following, by taking the XPS command TL 610 in FIG. 6B as an example, calculation of the character advance width from XPS data is explained. In the following, the character advance width calculated from XPS data is called "XPS character advance width".

First, in an element 611 of Indices, "18, 16" is described. This indicates that Gid is "18" and AdvanceWidth is "16". That is, it is specified that as the first character 701, the character specified by Gid "18" in the font data indicated by FontUri be drawn and the character advance width 711 be set to "16". Actually, each character specified by each number of Gid is drawn through predetermined character map conversion, but it is not the main purpose of the present invention, and therefore, explanation is omitted. The unit character consisting of a combination of bars and spaces configuring a barcode is defined in this manner and due to this, for example, the drawing result such as the character 701 is obtained.

Here, in a case where the output resolution is 600 dpi, the X-coordinate (in terms of pixel) of the drawing start position in the first character 701 is found by expression (1) below. As described above, the drawing start position in this case means the position from which drawing of the bar portion to be actually painted black starts. In the case of the first character 701, drawing starts from the bar, and therefore, the drawing start position and the character start position coincide with each other. In contrast to this, in the case of the second character 702, the top portion is a space, and therefore, the drawing start position and the character start position do not coincide with each other.

Drawing start X-coordinate={OriginX*(first element of GlyphsRenderTransform)+(OffsetX of CanvasRenderTransform)}*(600 dpi/96 dpi)    expression (1)

From expression (1) described above, the X-coordinate of the drawing start position (=character start position) in the first character 701 is (181.92*0.116986+19.2)*(600/96)= 253.013082 (px).

Then, the XPS character advance width (in terms of pixel) between the characters is found by expression (2) below.

XPS character advance width=AdvanceWidth*(FontRenderingEmSize)/100)*(first element of GlyphsRenderTransform)*(600 dpi/96 dpi)    expression (2)

Consequently, the XPS character advance width from the first character to the second character is 16*(160/100)* 0.116986*(600/96)=18.71776 (px) from expression (2) described above.

Following the above, the calculation method of the drawing start position 702b in the second character 702 is explained. Here, the distance from the character start position to the drawing start position from which the pixel is actually drawn black is defined as "offset". Then, the offset is found by expression (3) below.

Offset=bbox_x0*(FontRenderingEmSize/1000)*(first element of GlyphsRenderTransform)*(600 dpi/96 dpi)    expression (3)

Consequently, an offset 2 of the second character 702 (distance between the character start position 702a and the drawing start position 702b) is 80*(160/1000)*0.116986* (600/96)=9.3588 (px) from Table 1 and expression (3) described above.

Then, the space width W12 between the character 701 and the character 702 is a value obtained by adding the offset value to the XPS character advance width, that is, 18.7177+ 9.3588=28.0765 (px)

Similarly, it is also possible to calculate the XPS character advance widths and the space widths between the second character 702 and the third character 703 and between the third character 703 and the fourth character 704, respectively. FIG. 8 is a table that puts together the character advance widths, the offsets, and the space widths relating to the four characters 701 to 704 shown in FIG. 7. Then, in the table in FIG. 8, in a row 802, calculation results from the XPS command TL 610 and in a row 803, calculation results from the XPS command BR 620 are shown, respectively. Further, in a row 801, the character advance width, the offset, and the space width of each character, which are obtained from a drawing command in the GDI format, are described. From the drawing command in the GDI format, each value is obtained as an integer value. It is known from the rows 802 and 803 that in a case where the barcode is drawn by using the XPS character advance width calculated from the XPS data, the space width does not coincide with that of the GDI print path depending on the print position of the barcode and a shift has occurred. For example, in a case where attention is focused on the space width W23, while the value in the BR barcode 602 is 33.926 (px), the value in the GDI print path is 33 (px). Consequently, the space width calculated from the XPS data is larger by an amount corresponding to about one pixel. Further, in a case where attention is focused on the space width W34, while the value in the BR barcode 602 is 31.586 (px), the value in the GDI print path is 32 (px), and therefore, the space width calculated from the XPS data is smaller by an amount corresponding to about 0.4 pixels. It is not possible to resolve such a shift even by uniformly performing the rounding processing with the same contents for each value of the character advance widths, the offsets, and the space widths described in the rows 802 and 803.

For example, it is assumed that the rounding processing to round off a value to the nearest integer is performed uniformly for each value described in the rows 802 and 803. In this case, for example, for the space width 34, the value "32.756" in the row 802 is rounded off to 33 (px), which is a result different from 32 (px) in the row 801. Further, also for the space width W23, the value "33.926" in the row 803 is rounded off to 34 (px), which is a result different from 33 (px) in the row 801.

Next, it is assumed that the rounding processing to round up a value to the nearest larger integer is performed uniformly for each value described in the rows 802 and 803. In this case, for example, for the space width W12, the value "28.077" in the rows 802 and 803 is rounded up to 29 (px), which is a result different from 28 (px) in the row 801. Further, also for the offset 2, the value "9.359" in the rows 802 and 803 is rounded up to 10 (px), which is a result different from 9 (px) in the row 801.

Then, it is assumed that the rounding processing to round down a value to the nearest smaller integer is performed uniformly for each value described in the rows 802 and 803. In this case, for example, for the space width W23, the value "32.756" in the row 802 is rounded down to 32 (px), which is a result different from 33 (px) in the row 801. Further, also for the space width 34, the value "31.586" in the row 803 is rounded down to 31 (px), which is a result different from 32 (px) in the row 801.

As described above, by only applying one of, rounding down, and rounding up uniformly, it is not possible to cause each value of the character advance width, the offset, and the space width in the GDI print path described in the row 801 to coincide with the value calculated from the XPS data.

<Rendering Processing of Barcode-Attached Document>

Figure 5:
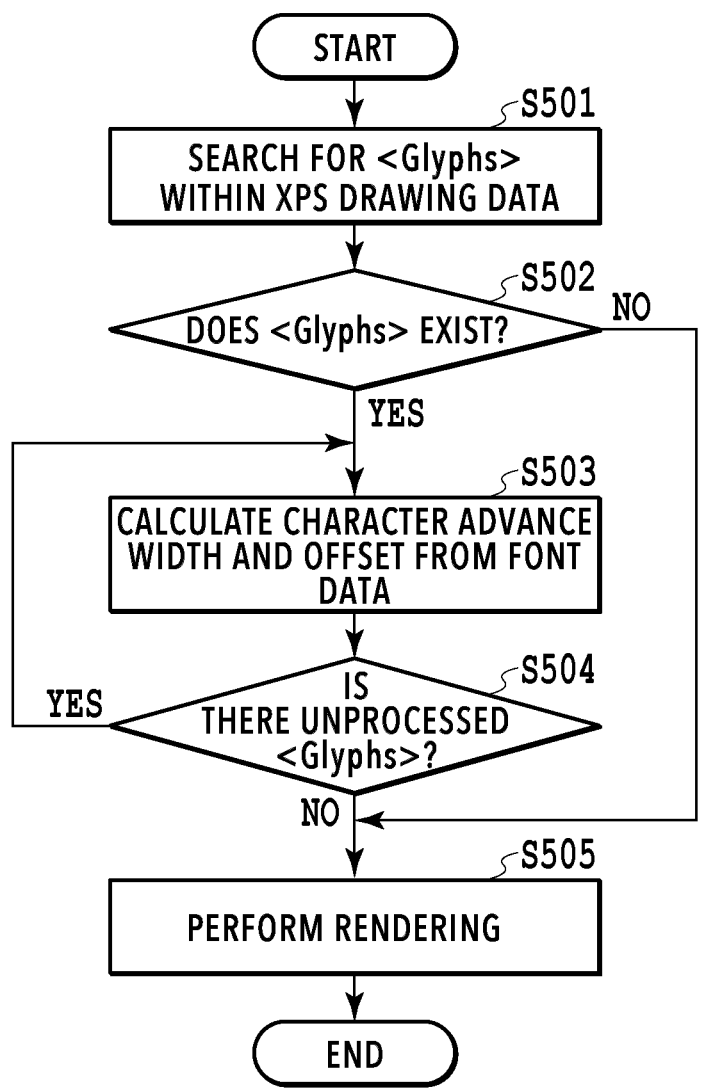
FIG. 5 is a flowchart showing a flow of rendering processing to implement an appropriate space width at the time of forming a barcode.

FIG. 5 is a flowchart showing a flow of rendering processing to implement an appropriate space width at the time of forming a barcode according to the present embodiment. In view of the above-described problem, the flowchart is designed so that the output results equivalent to those of the V3 driver are obtained at the time of processing XPS data input from the MXDC by the V4 driver, which is instructions to print a barcode-attached document using a barcode font. In the following, explanation is given along the flow in FIG. 5.

At step 501, in the XPS analysis unit 301, a search for a text-attribute drawing command that uses a font is made for XPS data giving instructions to print a barcode-attached document, which is input from the MXDC 202. Specifically, whether or not there is a <Glyphs> tag is checked, which is included without exception in a case of barcode printing that makes use of a barcode font. For example, even though the barcode printing is the same, in a case where a barcode is drawn as a graphics-attribute object that makes use of a path, or in a case where a barcode is drawn as an image-attribute object by a bitmap image, the above-described problem does not occur. Consequently, at this step, whether or not there is a <Glyphs> tag within the XPS data is checked.

At step 502, the processing is branched in accordance with the search results at step 501. In a case where there is no <Glyphs> tag within the XPS data, the processing advances to step 505 and in a case where there is a <Glyphs> tag, the processing advances to step 503.

At step 503, in the XPS analysis unit 301, the character advance width at the device resolution and the offset are calculated from the font data, not from the XPS data. In the following, by taking the XPS command TL 610 in the XPS data in FIG. 6B described previously as an example, how to calculate the character advance width from the font data is explained. In the following, the character advance width calculated from the font data is called "font character advance width".

As described previously, Gid in the element 611 corresponding to the first character 701 is "18" and it is known that the character advance width indicated by WX is "160" (see Table 1 described above). Here, the character advance width is in units of "100/UPM" and it is assumed that the UPM of a character is "1000". In a case where the output resolution is 600 dpi, the X-coordinate (in terms of Pixel) of the drawing start position in the first character 701 is found by expression (4) below.

Font character advance width=$WX$*(100/UPM)*(FontRenderingEmSize/100)*(first element of GlyphsRenderTransform)*(600 dpi/96 dip)    expression (4)

Consequently, the font character advance width 711 from the first character 701 to the second character 702 is 160*(100/1000)*(160/100)*0.116986*(600/96)=18.7177 (px) from expression (4) described above. Further, it is also possible to find the drawing start position 702b (=offset 2) in the second character 702 similarly from Table 1 described above and expression (3) described above and 9.3588 (px) is obtained. Consequently, the space width W12 is 28.0765 (px), which is the same result as that calculated from the XPS data. Then, for the character corresponding to Gid "65" of an element 612, the font character advance width 712, an offset 3, and the space width W23 are calculated similarly by using the character advance width "280" indicted by WX in Table 1. Further, for the character corresponding to Gid "36" of an element 613, the font character advance width 713, an offset 4, and the space width W34 are calculated similarly by using the character advance width "240" indicted by WX in Table 1. These calculation results are shown in "Font (actual value)" in a row 804 in the table in FIG. 8.

At step 504, whether there remains an unprocessed <Glyphs> tag within the XPS data is determined. In a case where there is an unprocessed <Glyphs> tag, the processing returns to step 503 and the processing to calculate the character advance width and the offset from the font data is repeated. On the other hand, in a case where all <Glyphs> tags that are found within the XPS data have already been processed, the processing advances to step 505.

At step 505, in the image processing unit 302, rasterization of each object to which drawing instructions are given in the XPS data is performed. Then, for a text-attribute object that uses a font, rasterization of the character font is performed by the font rasterizer 207 via the font processing unit 206. At this time, by using a value obtained by performing predetermined rounding processing to obtain an integer for each value of the font character advance width and the offset calculated at step 503, an appropriate space width is implemented in a barcode that is printed. Specifically, the predetermined rounding processing in the present invention is "rounding off to the nearest integer" for the font character advance width, and "rounding down to the nearest smaller integer" for the offset value. Then, a total value obtained by adding each value of the font character advance width and the offset after the rounding processing is the space width. The results obtained by performing the rounding processing are described in "Font (rounded)" in a row 805 in FIG. 8. By comparing each value described in the row 805 in FIG. 8 with each value described in the row 801, it is known that all the values coincide with each other. Due to this, also in the XPS print path via the MXDC 202, the space width of the barcode font coincides with the space width in the GDI print path.

The above is the contents of the rendering processing of a text-attribute object that uses a barcode font according to the present embodiment. In the flow described above, for drawing of a text-attribute object that uses a font, all of the character advance widths calculated from the font data are used. However, it is required for the barcode font to strictly reproduce the thickness of the bar and the bar spacing, but in the normal character drawing, there is a case where the accuracy of the character advance width is not required so strictly. Consequently, it may also be possible to calculate the character advance width from font data only for an object in which the barcode font within the input XPS data is used. It is possible to determine whether the barcode font is used by, for example, checking whether a bitmap of the barcode exists in the print data by performing pre-rendering. Alternatively, it may also be possible to check whether the font information and the barcode type described in the XPS data coincide with the barcode font registered in the OS. Further, it may also be possible to perform the flow in FIG. 5 only in a case where the print mode (barcode print mode) that uses the barcode font is specified via a UI (user interface) of the PC 10.

MODIFICATION EXAMPLE

Figures 9A, 9B:
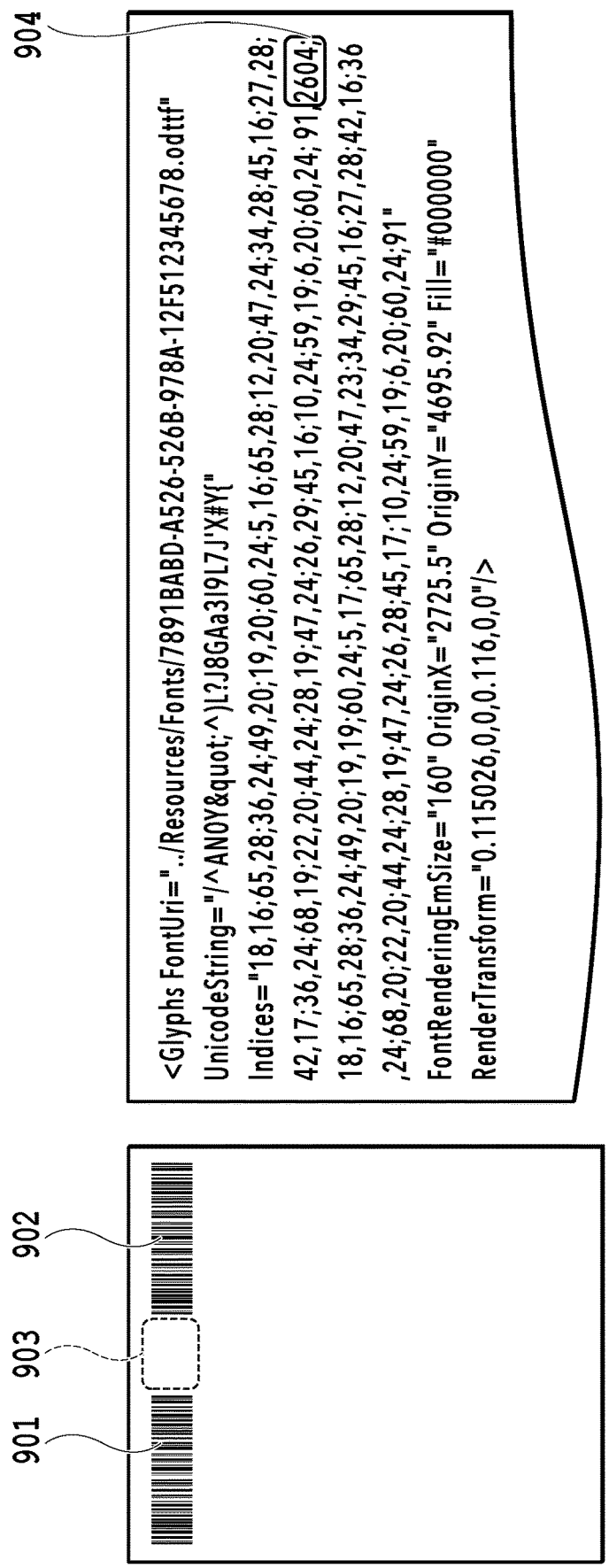
FIG. 9A is a diagram showing an example of a document in which barcodes are arranged and FIG. 9B is a diagram showing an example of XPS data specifying drawing using a barcode font, according to a modification example.

It is not possible to apply the above-described method in a case where two barcodes 901 and 902 drawn by using the barcode font exist on the same X-coordinate within a page, for example, as shown in FIG. 9A. FIG. 9B is XPS data of the page on which the two barcodes 901 and 902 exist on the same X-coordinate, with a blank 903 being sandwiched in between. In this XPS data, within one <Glyphs> tag, the number of Gid of the unit character configuring each barcode and information on the character advance width for each character are described in correspondence to the two barcodes 901 and 902. Then, in Indices, information (element) 904 on the character advance width corresponding to the blank 903 is also described. That is, the character advance width indicated by the element 904 in this case is not the character advance width indicating the spacing between bars within one barcode. There is a case where such a blank is provided intentionally by a user or a case where such a blank is inserted automatically by an application. In each case, on a condition that the above-described method is applied to the character advance width indicating the intentional blank portion such as this, a blank whose width is different from that of an intended blank will result.

Consequently, an aspect is explained as a modification example in which in a case where the character advance width described in Indices is an "advance width indicating a blank between two barcodes", the method of the present embodiment is not applied.

Figure 10:
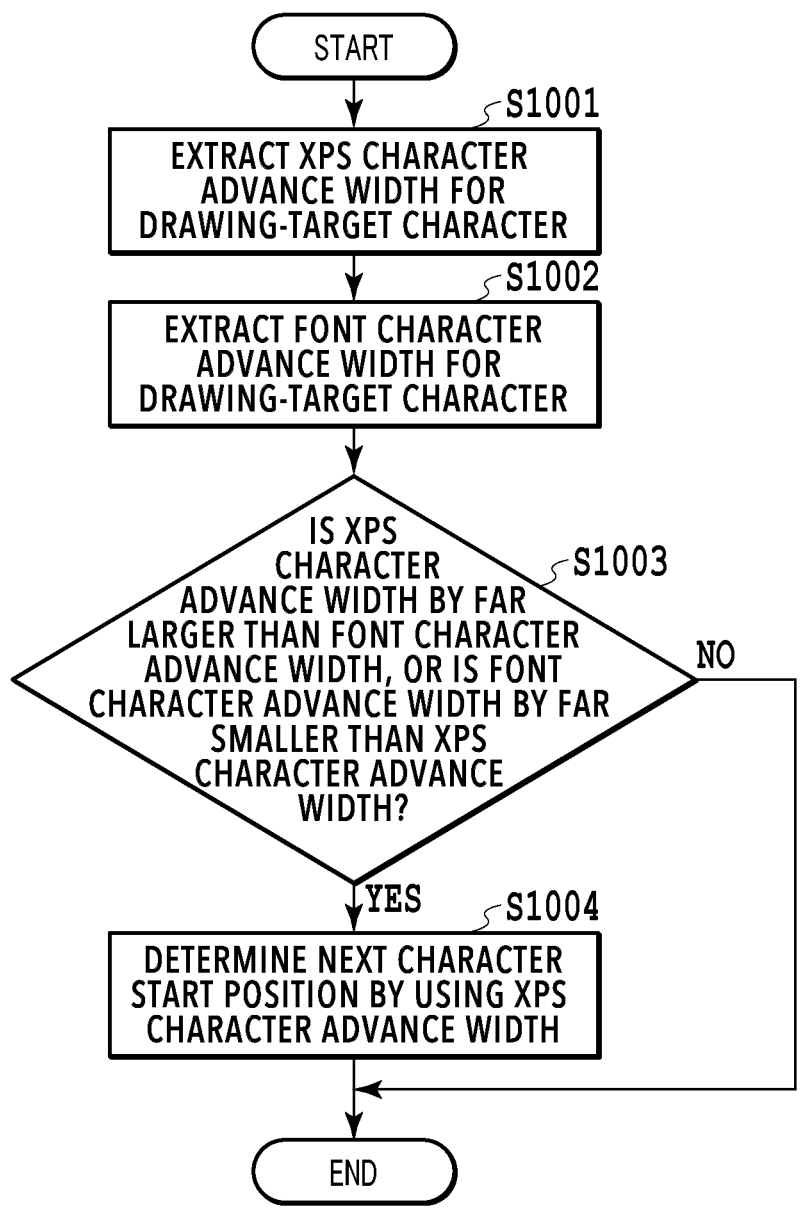
FIG. 10 is a flowchart showing details of calculation of a character advance width according to the modification example.

FIG. 10 is a flowchart showing details of processing to secure an appropriate character advance width according to the present modification example. This flow corresponds to step 503 in the flow in FIG. 5. In a case where the present modification example is applied, it is not necessary to change steps other than step 503 of each step in the flow in FIG. 5, and therefore, explanation thereof is omitted. In the following, on the assumption that the XPS data in FIG. 9B is input, the processing contents in the present modification example are explained along the flow in FIG. 10.

At step 1001, from the XPS data in FIG. 9B, the XPS character advance width for the drawing-target character is extracted. In a case where the character specified by the number "91" of Gid (character that is drawn immediately before the blank 903) is the drawing-target character, the value "2604" of the element 904 is extracted as the XPS character advance width.

At step 1002 that follows, from the font data shown in Table 1 described previously, the font character advance width for the drawing-target character is extracted. The extraction method is the same as that explained at step 503. Here, from expression (4) described previously, 520*(100/1000)*(160/100)*0.115026*(600/96)=59.81352 (px) is calculated as the font character advance width. At the time of calculating the font character advance width, the offset is also calculated simultaneously as described previously, but explanation is omitted here.

At step 1003, the XPS character advance width extracted at step 1001 is compared with the font character advance width extracted at step 1002. In a case where the results of the comparison between both widths indicate that the absolute value of the difference is a very large value larger than or equal to a predetermined value, it is determined that the character advance width for the drawing-target character is a blank between characters provided intentionally, such as the blank 903. Here, as a condition for the determination of whether "the absolute value of the difference is very large", there is an example in which the absolute value of the difference is larger than the maximum value or smaller than the minimum value of the character advance widths of all the characters specified by Gid within the font data. In a case where it cannot be said that the absolute value of the obtained difference is very large, it is determined that the character advance width for the drawing-target character is not an intentional blank. In this manner, whether or not to apply the method of the present embodiment is determined and the processing is branched in accordance with the determination results. Specifically, only in a case where the absolute value of the difference between the XPS character advance width and the font character advance width is very large and it is determined that the character advance width is a blank between characters, which is provided intentionally, the processing advances to step 1004. Then, in a case where it is determined that the character advance width is not an intentional blank, this processing is exited.

At step 1004, as an appropriate character advance width, the XPS character advance width is adopted and the character start position of the character, which is the next drawing target, is determined. In this case, it is possible to find the character start position for the character that is drawn immediately after the intended blank from the total value of the character advance widths of the characters before the blank (characters already drawn on the same X-coordinate). For example, in a case where the character immediately after the intentional blank is the tenth character within the <Glyphs> tag, with the start coordinate of <Glyphs> being taken to be the start point, the total value of the XPS character advance width of each of the first to ninth characters is taken to be the start coordinate of the next drawing-target character. The reason is that the absolute coordinate of the character advance width described in the XPS data is considered accurate although the relative coordinate of the character advance width fluctuates, and therefore, the start position of the character that is drawn immediately after the intentional blank will become more accurate in a case where the start position is determined by using those values.

The above is the contents of the processing to secure an appropriate character advance width by determining the kind of character advance width according to the present modification example. As described above, according to the method of the present modification example, in a case where the character advance width described in the XPS data indicates a blank provided intentionally by a user or an application, the method of the embodiment described above is avoided from being applied and an appropriate character advance width is secured. As a result of this, it is made possible to draw an intentional blank with an intended space width while guaranteeing an accurate character advance width at the time of drawing a unit character configuring a barcode.

As above, in the present embodiment, rendering of a barcode font is performed based on a character advance width calculated from font data. Due to this, even in a case where PDL data for printing a barcode using a font is generated by the V4 driver in accordance with XPS data from the MXDC, it is made possible to print a barcode with an appropriate bar spacing. In the barcode thus printed, the bar spacing is close to a theoretical value, and therefore, it is possible to read the barcode accurately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a case where drawing data for performing printing by using a barcode font is processed in the XPS print path, it is possible to obtain the same output results as those of the GDI print path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-031474, filed Feb. 26, 2018 which is hereby incorporated by reference wherein in its entirety.

What is claimed is:

1. An information processing apparatus comprising:
a memory that stores a program; and
a processor that executes the program to perform generating PDL data by:
calculating, in a case where a drawing-target object within XPS format drawing data is a text-attribute character object that is drawn by using a font, a first character advance width from font data installed in the information processing apparatus; and
performing rendering for the XPS format drawing data by using the calculated first character advance width instead of a second character advance width described in the XPS format drawing data.

2. The information processing apparatus according to claim 1, wherein the processor calculates, in a case where a drawing-target object within the XPS format drawing data is a text-attribute character object that is drawn by using the font, the first character advance width at a device resolution from information on a character advance width included in the installed font data.

3. The information processing apparatus according to claim 1, wherein the font is a barcode font.

4. The information processing apparatus according to claim 3, wherein the processor executes the program to further perform:
providing a user interface for specifying a print mode, and
the processor performs, in a case where a print mode that uses the barcode font is specified via the user interface, rendering for the character object based on the first character advance width calculated from the installed font data.

5. The information processing apparatus according to claim 3, wherein the processor generates PDL data by:
determining whether a character object that is drawn by using the barcode font exists within the XPS format drawing data;
calculating, in a case of determining that a character object that is drawn by using the barcode font exists within the XPS format drawing data, the first character advance width from the installed font data; and
performing rendering for the XPS format drawing data by using the calculated first character advance width instead of the second character advance width described in the XPS format drawing data.

6. The information processing apparatus according to claim 5, wherein the processor determines, in a case of performing pre-rendering for the XPS format drawing data and where results of the pre-rendering indicate that there is a bitmap of a barcode, that a character object that is drawn by using the barcode font exists.

7. The information processing apparatus according to claim 5, wherein the processor determines, in a case where font information or a barcode type within the XPS format drawing data coincides with a barcode font registered in an OS, that a character object that is drawn by using the barcode font exists.

8. The information processing apparatus according to claim 2, wherein the processor:
performs first rounding processing to obtain an integer value for the character advance width at the device resolution, which is calculated from information on a character advance width included in the installed font data;
calculates an offset value indicating a distance from a character start position to a drawing start position from the installed font data and performs second rounding processing to obtain an integer value for the calculated offset value; and
performs rendering for a next drawing-target character object based on a position specified by a value obtained by adding a character advance width and an offset value after the rounding processing.

9. The information processing apparatus according to claim 8, wherein the first rounding processing is rounding off to the nearest integer; and
the second rounding processing is rounding down to the nearest smaller integer.

10. The information processing apparatus according to claim 2, wherein the processor:
calculates a third character advance width at the device resolution from information on the second character advance width described in the XPS format drawing data; and
performs, in a case where an absolute value of a difference between the calculated first character advance width and the calculated third character advance width satisfies a predetermined condition, rendering for a next drawing-target character object based on the third character advance width calculated from the XPS format drawing data.

11. The information processing apparatus according to claim 10, wherein the rendering unit determines, in a case where the absolute value of the difference is larger than a maximum value or smaller than a minimum value of character advance widths of all characters specified by Gid within the font data, that the absolute value of the difference satisfies the predetermined condition.

12. The information processing apparatus according to claim 1, wherein the processor further executes a converter program to perform:
converting GDI format drawing data input from an application into the XPS format drawing data.

13. An information processing method comprising the steps of:
generating PDL data by:
(1) calculating, in a case where a drawing-target object within XPS format drawing data is a text-attribute character object that is drawn by using a font, a first character advance width from font data installed in an information processing apparatus; and
(2) performing rendering for the XPS format drawing data by using the calculated first character advance width instead of a second character advance width described in the XPS format drawing data.

14. A non-transitory computer-readable storage medium storing a printer driver that generates PDL data from XPS format drawing data, wherein
the printer driver generates the PDL data by:
(1) calculating, in a case where a drawing-target object within the XPS format drawing data is a text-attribute character object that is drawn by using a font, a first character advance width from font data installed in an information processing apparatus; and
(2) performing rendering for the XPS format drawing data by using the first calculated character advance width instead of a second character advance width described in the XPS format drawing data.

15. The non-transitory computer-readable storage medium according to claim 14, wherein the printer driver calculates, in a case where a drawing-target object within the XPS format drawing data is a text-attribute character object that is drawn by using the font, the first character advance width at a device resolution from information on a character advance width included in the installed font data.

16. The non-transitory computer-readable storage medium according to claim 14, wherein the font is a barcode font.

17. The non-transitory computer-readable storage medium according to claim 16, wherein the printer driver further provides a user interface for specifying a print mode, and wherein the printer driver performs, in a case where a print mode that uses the barcode font is specified via the user interface, rendering for the character object based on the first character advance width calculated from the installed font data.

18. The non-transitory computer-readable storage medium according to claim 14, wherein the XPS format drawing data is drawing data converted from GDI format drawing data by a converter.

\* \* \* \* \*